US012338115B2

(12) United States Patent
Pellaud

(10) Patent No.: US 12,338,115 B2
(45) Date of Patent: Jun. 24, 2025

(54) BEVERAGE DISPENSING ASSEMBLY COMPRISING AN INGREDIENT CONTAINER RECEIVING MEANS AND A GAS PRESSURE REGULATOR AND METHOD OF DISPENSING A BEVERAGE WITH SUCH ASSEMBLY

(71) Applicant: Anheuser-Busch InBev S.A., Brussels (BE)

(72) Inventor: Jerome Pellaud, New Rochelle, NY (US)

(73) Assignee: Anheuser-Busch InBev S.A., Brussels (BE)

( * ) Notice: Subject to any disclaimer, the term of this patent is extended or adjusted under 35 U.S.C. 154(b) by 952 days.

(21) Appl. No.: 17/477,335

(22) Filed: Sep. 16, 2021

(65) Prior Publication Data

US 2022/0002134 A1 Jan. 6, 2022

Related U.S. Application Data

(63) Continuation of application No. 15/514,487, filed as application No. PCT/EP2015/072132 on Sep. 25, 2015, now abandoned.

(30) Foreign Application Priority Data

Sep. 26, 2014 (EP) .................................... 14186713

(51) Int. Cl.
*B67D 1/00* (2006.01)

(52) U.S. Cl.
CPC ......... *B67D 1/0029* (2013.01); *B67D 1/0021* (2013.01); *B67D 1/0051* (2013.01);
(Continued)

(58) Field of Classification Search
CPC .. B67D 1/0029; B67D 1/0021; B67D 1/0051; B67D 1/0057; B67D 1/0073; B67D 1/0075; B67D 1/0078; B67D 2001/0092
(Continued)

(56) References Cited

U.S. PATENT DOCUMENTS 5,473,909 A 12/1995 Kateman et al.
5,565,149 A * 10/1996 Page ...................... B01D 61/00 261/DIG. 7
(Continued)

FOREIGN PATENT DOCUMENTS

CN 1852858 10/2006
CN 101472831 7/2009
(Continued)

*Primary Examiner* — Jimmy Chou
(74) *Attorney, Agent, or Firm* — ArentFox Schiff LLP

(57) ABSTRACT

A beverage dispensing assembly for preparing and dispensing a beverage has a source of pressurized base liquid containing dissolved $CO_2$, $N_2$ or $N_2O$ and a gas pressure of at least 0.5 bar overpressure at 2° C. A beverage unit with a liquid flow path has a liquid inlet at one end in fluid communication with the base liquid in the base liquid source and a beverage outlet at an opposite end. An ingredient container receiving slot has an ingredient container installed so the contents are in fluid communication with the liquid flow path for mixing the contents with a base liquid in the liquid flow path. A gas pressure regulation unit has a pressure chamber in the liquid flow path downstream of the communication between the liquid flow path and the ingredient container contents. A gas ingredient inlet is in fluid communication with the pressure chamber.

7 Claims, 2 Drawing Sheets

Figure 1:
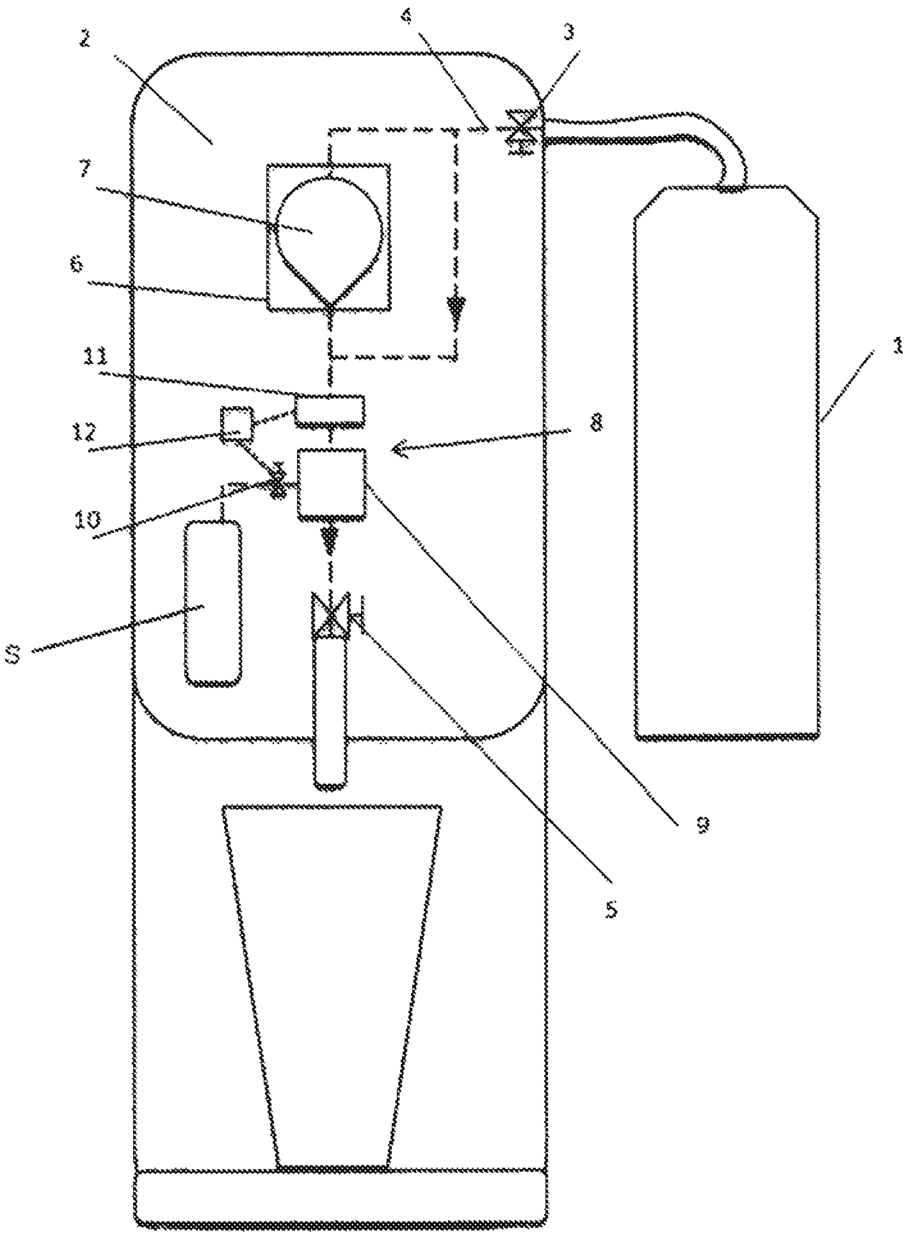

(52) U.S. Cl.
CPC ......... *B67D 1/0057* (2013.01); *B67D 1/0073* (2013.01); *B67D 1/0075* (2013.01); *B67D 1/0078* (2013.01); *B67D 2001/0092* (2013.01)

(58) Field of Classification Search
USPC ............................................................ 99/323
See application file for complete search history.

(56) References Cited

U.S. PATENT DOCUMENTS

| | | | | |
|---|---|---|---|---|
| 6,669,053 | B1 * | 12/2003 | Garson | B67D 1/1281 222/61 |
| 9,004,744 | B1 * | 4/2015 | Kemp | B01F 25/31323 366/175.2 |
| 2006/0243752 | A1 * | 11/2006 | Pakkert | B67D 1/0412 222/399 |
| 2009/0069930 | A1 | 3/2009 | Peters et al. | |
| 2010/0133708 | A1 * | 6/2010 | Fischer | B67D 1/0059 137/511 |
| 2010/0252584 | A1 | 10/2010 | Celli | |
| 2011/0123688 | A1 | 5/2011 | Deo et al. | |
| 2012/0305605 | A1 * | 12/2012 | Vassaux | B67D 1/0001 251/129.01 |
| 2013/0156913 | A1 * | 6/2013 | Buttiker | A47J 31/467 426/433 |
| 2014/0147558 | A1 * | 5/2014 | Rasmussen | C12C 11/11 426/106 |
| 2014/0150669 | A1 | 6/2014 | Green et al. | |
| 2014/0154369 | A1 * | 6/2014 | Kolls | A23L 2/54 426/115 |
| 2016/0244248 | A1 * | 8/2016 | Corker | A47J 31/407 |
| 2021/0354971 | A1 | 11/2021 | Peirsman et al. | |

FOREIGN PATENT DOCUMENTS

| | | |
|---|---|---|
| CN | 103889882 | 6/2014 |
| CN | 107074518 | 8/2017 |
| EP | 0 364 206 | 4/1990 |
| EP | 2 146 832 | 10/2008 |
| EP | 2 148 770 | 10/2008 |
| EP | 2 148 771 | 10/2008 |
| EP | 2 152 486 | 10/2008 |
| EP | 2 152 494 | 10/2008 |
| GB | 2303354 | 2/1997 |
| JP | S53151999 | 11/1978 |
| JP | H08276121 | 10/1996 |
| JP | H10302141 | 11/1998 |
| WO | WO 2005/012157 | 2/2005 |
| WO | WO 2007/148360 | 12/2007 |
| WO | WO 2010031764 | 3/2010 |
| WO | WO 2013/026703 | 2/2013 |
| WO | WO 2013/139864 | 9/2013 |

* cited by examiner

BEVERAGE DISPENSING ASSEMBLY COMPRISING AN INGREDIENT CONTAINER RECEIVING MEANS AND A GAS PRESSURE REGULATOR AND METHOD OF DISPENSING A BEVERAGE WITH SUCH ASSEMBLY

The present invention relates to a beverage dispensing device for dispensing different types of beverages or beverage components, wherein at least one of the beverage ingredients is provided for mixing the ingredient with a base liquid.

More in particular, the present invention relates to such a beverage dispensing device, wherein at least one of said beverages or beverage components is a malt based beverage or a malt based beverage component.

At present there is a trend to fancier kinds of beverages, wherein multiple beverage components or beverages are added to one another so to provide a consumer with a sensation adapted to his taste.

According to the state of the art all kinds of beverage dispensing devices exist which allow for the dispensing of different types of beverages or beverage components, such as beverage dispensing devices for dispensing different types of coffees and teas possibly mixed with milk, cream or sugar and so on.

Usually, the coffee or tea is made by passing hot water through coffee powder or tea leaves respectively.

Other beverage dispensing devices are for example intended for dispensing all kinds of juices or sodas.

It is clear that such beverage dispensing devices are of a complete other category than the type of beverage dispensing devices of interest in the present invention.

Indeed, the dispensing of different types of beverages or beverage components wherein at least one of the one of said beverages or beverage components is a malt based beverage or a malt based beverage component or a cider requires adapted equipment which is capable of coping with the specific needs related to malt based beverages or beverage components.

For example when dispensing a malt based beverage or beverage component, it is important to control foaming of the concerned beverage or beverage component.

Furthermore, the rate of dispensing, the pressures involved during dispensing and the volumes of liquid dispensed in beverage dispensing devices wherein at least one of the beverages or beverage components is a malt based beverage or a malt based beverage component are usually much higher than in the typical coffee machines or the like and require adapted equipment with increased capacity and strength.

Moreover gas pressure in the beverage is considered a key component for the refreshing sensation and taste of malt-based beverages or ciders and needs to be kept within a narrow range (in function of temperature and beverage type) to meet the consumers expectations, without increasing dispensing time or beverage preparation time.

It is understood that dispensing of such a beverage requires some skill and is time consuming.

It is also clear that depending on the person that is dispensing the beverage the volume ratio of the different beverage components dispensed can vary easily, resulting in a varying composition of the finally dispensed beverage, which is often not desired.

It is therefore an objective of this invention to overcome one or more of the above-mentioned drawbacks or possibly other non-mentioned drawbacks of the known beverage dispensing devices.

To this aim, the present invention proposes a beverage dispensing assembly for preparing and dispensing a carbonated beverage the assembly comprising:

- a source of pressurized base liquid having $CO_2$, $N_2$ or $N_2O$ dissolved therein and having a gas pressure of at least 0.5 bar overpressure at 2° C.;
- a beverage unit with a liquid flow path having a liquid inlet at one end, in fluid communication with the base liquid in the source of base liquid by means of a valve and a beverage outlet at an opposite end; an ingredient container receiving means having an ingredient container installed therein such that when correctly installed, the content of the ingredient container is in fluid communication with the liquid flow path for mixing the content of the ingredient container with a base liquid in the liquid flow path;
- a gas pressure regulation unit having a pressure chamber provided in the liquid flow path downstream of the fluid communication between the liquid flow path and the content of the ingredient container; a gas ingredient inlet in fluid communication with the pressure chamber through a valve.

The dispensing device further preferably comprises a device for measuring the amount of dissolved and/or entrained gasses in the beverage, said measuring device configured to measure the amount of dissolved and/or entrained gasses in the beverage at a location along the liquid flow line downstream of the fluid communication between the ingredient container content and the liquid line, and upstream the gas pressure regulation unit.

A microprocessor and actuator configured to control operation of the valve provided at the gas ingredient inlet in the gas pressure regulation unit based on input received from the measuring device is preferably provided allowing regulating the gas pressure of the beverage to a desired level.

The gas ingredient inlet can be coupled to a pressurized gas source (S) or to a source of food-grade carbonates or acids capable of generating carbon dioxide when reacted in the presence of water.

The present invention also concerns a method for preparing dispensing a carbonated beverage comprising the steps of:

- providing an ingredient container;
- providing a pressurised base liquid having an $CO_2$, $N_2$ or $N_2O$ dissolved therein and having a gas pressure of at least 0.5 bar overpressure at 2° C.;
- mixing the content of the ingredient container with the base liquid to prepare the beverage to be dispensed;
- subsequent to the mixing step, increasing the gas pressure of the beverage prior dispensing by mixing the beverage and an amount of a gas ingredient;
- dispensing the beverage.

The ingredient container preferably contains a unit dose of beverage ingredient intended for preparing one single beverage.

According to a preferred execution the method comprises the additional step of measuring the gas pressure on the beverage after the step of mixing the content of the ingredient with the base liquid and before the step of increasing the gas pressure of the beverage.

The increasing of the gas pressure in the beverage (further also addressed as recarbonation) is obtained by contacting the beverage with a pressurized gas stream comprising $CO_2$, $N_2$ or $N_2O$ and optionally a scent.

Figure 2:
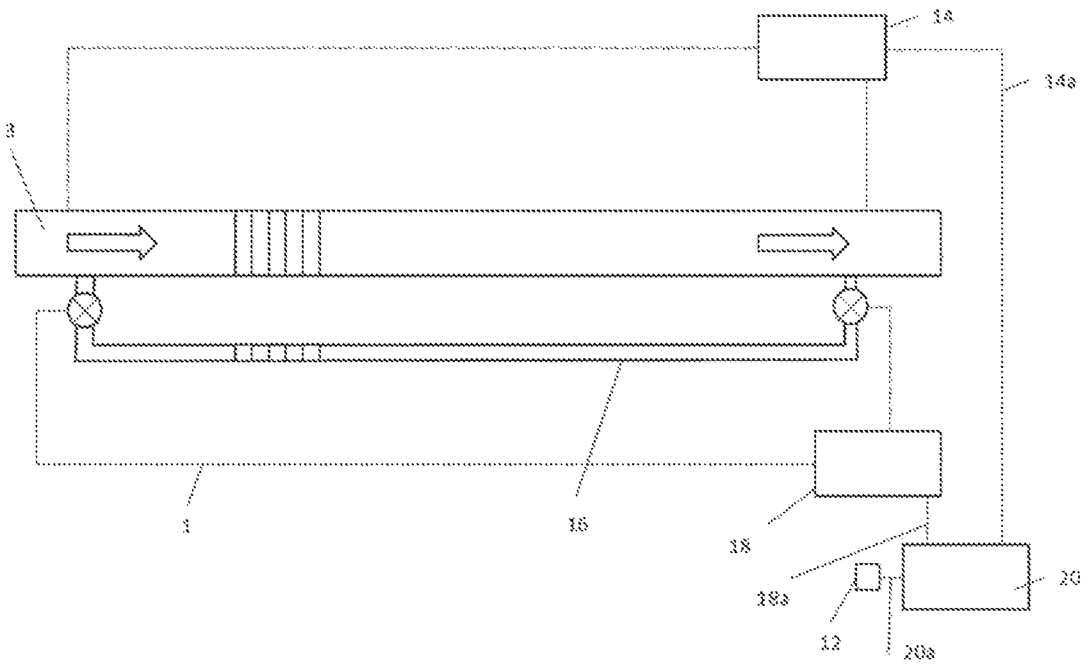

With the intention of better showing the characteristics of the invention, hereafter, as example without any limitative character, some embodiments of a beverage dispensing device according to the invention are described, with reference to the accompanying drawings, wherein:

FIG. 1 schematically represents an beverage dispensing assembly in accordance with the present invention;

FIG. 2 schematically represents a device for measuring the amount of dissolved and/or entrained gasses in the beverage

DEFINITIONS

For the sake of the description the term carbonated liquid is to be interpreted as any type of liquid in which carbon dioxide (CO2), nitrogen (N2), N2O or admixtures thereof are dissolved and having a gas pressure of at least 0.5 bar overpressure at 2° C.

A gas ingredient is any type of ingredient that allows introducing $CO_2$, $N_2$ or $N_2O$ in a liquid, in particular an aqueous liquid or water.

DESCRIPTION OF A PREFERRED EMBODIMENT

FIG. 1 schematically represents a beverage dispensing assembly according to the invention, for preparing and dispensing a carbonated beverage the assembly comprising:

- a source (1) of pressurized base liquid having $CO_2$, $N_2$ or $N_2O$ dissolved therein and having a gas pressure of at least 0.5 bar overpressure at 2° C.;
- a beverage unit (2) with a liquid flow path (4) having a liquid inlet (3) at one end, in fluid communication with the base liquid contained in the source of pressurized gas by means of a valve and a beverage outlet (5) comprising a dispense valve at an opposite end; an ingredient container receiving means (6) having an ingredient container (7) installed therein such that when correctly installed, the content of the ingredient container is in fluid communication with the liquid flow path for mixing the content of the ingredient container with a base liquid in the liquid flow path;
- a gas pressure regulation unit (8) having with a pressure chamber (9) provided in the liquid flow path downstream of the fluid communication between the liquid flow path and the content of the ingredient container; a gas ingredient inlet in fluid communication with the pressure chamber through a valve (10); and
- a device (11) for measuring the amount of dissolved and/or entrained gasses in the beverage, said measuring device configured to measure the amount of dissolved and/or entrained gasses in the beverage at a location along the liquid flow line downstream of the fluid communication between the ingredient container content and the liquid line, and upstream the gas pressure regulation unit.

The dispensing assembly further preferably comprises a microprocessor and actuator (12) configured to control operation of the valve provided at the gas ingredient inlet in the gas pressure regulation unit based on input received from the measuring device.

The valve at the liquid inlet and beverage outlet is preferably operable by means of a tap handle.

The source of pressurized base liquid is preferably a keg or bag-in-bottle type of container comprising an inner, collapsible bladder or bag containing the beverage to be dispensed, which is contained in an outer, more rigid container have been used. Recently, cost effective bag-in-containers have been developed allowing their extensive use in mass consumer goods such as beer kegs, cider kegs, and the like (cf. e.g., EP2146832, EP2148770, WO2010/031764, EP2152494, EP2152494, EP2152486, EP2152486, EP2148771).

The base liquid has $CO_2$, $N_2$ or $N_2O$ dissolved therein and has a gas pressure of at least 0.5 bar overpressure at 2° C. Suitable base liquids are amongst others, carbonated water; a fermented malt based beverage such as beer; a beer like beverage; cider or a cider like beverage.

The beverage unit comprises a liquid flow path having a liquid inlet at one end, coupled in fluid communication to the source of pressurized gas by means of a valve and a beverage outlet comprising a dispense valve at an opposite end; The base liquid inlet is preferably also coupled to a source of pressurized gas containing food grade $CO_2$, $N_2$ or $N_2O$ through a gas valve.

The ingredient container preferably contains exactly one unit dose of beverage ingredient and is therefore suited for preparing exactly one beverage allowing maximal flexibility to customize a beverage to be dispensed. The ingredient container is preferably of the kind generally addressed as pods or capsules and will be referred to as such in the description below.

The pod or capsule can contain a solid or liquid ingredient, varying from hop concentrates, fruit concentrates, sweeteners, bittering additives, concentrated spices, foaming promoters, concentrated malt-based liquids, concentrated fermented liquids, concentrated beer, colorants and or mixtures thereof.

The gas pressure regulation unit comprises a pressure chamber provided in the liquid flow path downstream of the fluid communication between the liquid flow path and the content of the ingredient container; a gas ingredient inlet in fluid communication with the pressure chamber through a valve.

The gas ingredient inlet preferably is a jet nozzle allowing sparging pressurized $CO_2$, $N_2$ or $N_2O$ in the pressure chamber, preferably in a direction opposite the flowing direction of the beverage in the beverage flow path, thereby allowing dissolving $CO_2$, $N_2$ or $N_2O$ in the beverage stream and thus carbonating the beverage to a desired gas pressure level. Both gas ingredients may be scented by a flavour, the flavour being preferably chosen from the group comprising: a fermented hop flavour; a fruit flavour; a herb flavour; a spice flavour; a confectionary flavour or admixtures thereof.

According to an alternative embodiment, the source of gas ingredient is a solid or liquid comprising effervescent or chemical reactants including all known, food-grade carbonates or acids that are capable of generating carbon dioxide when reacted in the presence of water.

The device for measuring the amount of dissolved and/or entrained gasses in the beverage, is schematically represented in FIG. 2, and includes a first entrained air measurement module 14 assigned to the beverage flow path; a bleed line 16; a second entrained air measurement module 18 assigned to the bleed line and a dissolved air/gas determination processor module 20. The first entrained air measurement module 14 is arranged in relation to the beverage flow path, for sensing entrained air in the beverage mixture and providing a first entrained air measurement module signal via line 14*a* containing information about sensed entrained air in the beverage mixture flowing through the flow path. The bleed line 16 is coupled to flow path 3 for bleeding beverage mixture from the flow path at a bleed line pressure that is lower than the pressure in the flow path at the measuring device, for example, at ambient pressure. The bleed line entrained air measurement module 18 is arranged in relation to the bleed line 16, for sensing entrained air in the beverage mixture in the bleed line, and providing a second entrained air measurement module signal via line 18*a* containing information about sensed bleed line entrained air. The dissolved air/gas determination processor module 20 responds to the first entrained air measurement module signal along line 14*a* and the second entrained air measurement module signal along line 18*a*, each signal being received via a controller module; determines dissolved air/gas in the beverage mixture flowing in the flow path based on a difference between the sensed flow path line entrained air and the sensed bleed line entrained air; and provides a dissolved air/gas determination processor module signal 20*a* containing information about the same.

The microprocessor and actuator are preferably provided which are configured to control operation of the valve(s) of the assembly provided at the gas ingredient inlet in the gas pressure regulation unit based on the dissolved air/gas determination processor module signal provided by the device for measuring the amount of dissolved and/or entrained gasses The method of preparing and dispensing a beverage with the above assembly is easy, user friendly and comprises:

providing an ingredient container;

providing a pressurised base liquid having $CO_2$, $N_2$ or $N_2O$ dissolved therein and having a gas pressure of at least 0.5 bar overpressure at 2° C.;

mixing the content of the ingredient container with the base liquid to prepare the beverage to be dispensed;

subsequent to the mixing step, increasing the gas pressure of the beverage prior dispensing by mixing the beverage and an amount of a gas ingredient;

dispensing the beverage.

Upon inserting a pod or capsule with a desired ingredient in the ingredient container receiving means, beverage dispensing can be activated by opening the valve at the flow path inlet, thereby allowing a predetermined amount of base liquid to enter the beverage flow path and mixing the content of the pod or capsule in the base liquid.

It has been observed that upon mixing with at least some ingredients, gas pressure on the beverage (base liquid+mixed ingredient(s)) reduces due to gas scavenging properties of the ingredient.

Such gas pressure drop has an important influence on the perceived taste and freshness sensation of a consumer consuming the beverage, especially in case of beer or cider. Therefore, the assembly comprises a gas pressure regulation unit, wherein the mixed beverage is contacted with CO2, N2 or N2O increasing the gas level in the beverage and compensating for the gas loss occurred during mixing.

In order to fine tune control of the gas pressure regulation or increasing the gas pressure it is preferred that the gas level or level of $CO_2$, $N_2$ or $N_2O$ dissolved in the beverage is measured post mixing. The outcome of this measurement is used for determining the gas pressure increase to be realised during the gas pressure regulation step that hence can be amended in terms of duration, amount of $CO_2$, $N_2$ or $N_2O$ fed and/or pressure of the $CO_2$, $N_2$ or $N_2O$ fed.

Methods for increasing the gas pressure in a liquid are well-known in the art and it is within the reach of a person skilled in the art to determine the specifics and settings of the gas pressure increase based on the gas increase to be realised.

As, according to the invention, the base liquid is carbonated prior mixing, a limited gas pressure regulation step will be needed only increasing the gas pressure level in small amounts, allowing performing this step in a rather quick manner not unduly increasing the dispense time for the beverage.

The invention claimed is:

1. A beverage dispensing assembly for preparing and dispensing a beverage the assembly comprising:

a source of pressurized base liquid having $CO_2$, $N_2$ or $N_2O$ dissolved therein and having a gas pressure of at least 0.5 bar overpressure at 2° C.;

a beverage unit with a liquid flow path having a liquid inlet at one end in fluid communication with the base liquid in the source of base liquid by means of a valve and a beverage outlet at an opposite end;

an ingredient container receiver having an ingredient container wholly installed and contained therein such that when correctly installed, the content of the ingredient container is in fluid communication with the liquid flow path for mixing the content of the ingredient container with a base liquid in the liquid flow path;

a gas pressure regulation unit having a pressure chamber provided in the liquid flow path downstream of the fluid communication between the liquid flow path and the content of the ingredient container; and a gas ingredient inlet in fluid communication with the pressure chamber through a valve, the gas ingredient inlet introducing pressurized $CO_2$, $N_2$ or $N_2O$ in the pressure chamber in the liquid flow path in a direction opposite the liquid flow path.

2. The assembly according to claim 1 comprising:

a device for measuring the amount of dissolved and/or entrained gasses in the beverage, said measuring device configured to measure the amount of dissolved and/or entrained gasses in the beverage at a location along the liquid flow line downstream of the fluid communication between the ingredient container content and the liquid line, and upstream the gas pressure regulation unit.

3. The assembly according to claim 1 comprising a microprocessor and actuator configured to control operation of the valve provided at the gas ingredient inlet in the gas pressure regulation unit based on input received from a measuring device.

4. The assembly according to claim 1, wherein the gas ingredient inlet is coupled to a pressurized gas source.

5. The assembly according to claim 4, wherein the gas in the pressurized gas source comprises at least one of $CO_2$, $N_2$ or $N_2O$.

6. The assembly according to claim 5, wherein the gas ingredient inlet is coupled to a source of food-grade carbonates or acids capable of generating carbon dioxide when reacted in the presence of water.

7. The assembly according to claim 2 comprising a microprocessor and actuator configured to control operation of the valve provided at the gas ingredient inlet in the gas pressure regulation unit based on input received from the measuring device.

* * * * *